Oct. 1, 1957 E. J. HLINSKY ET AL 2,808,118
CRAWLER SPEED INDICATOR
Filed March 10, 1955 2 Sheets-Sheet 1

INVENTORS
Emil J. Hlinsky
BY Jerry Karlovsky
Murray A. Gleeson
ATTORNEY

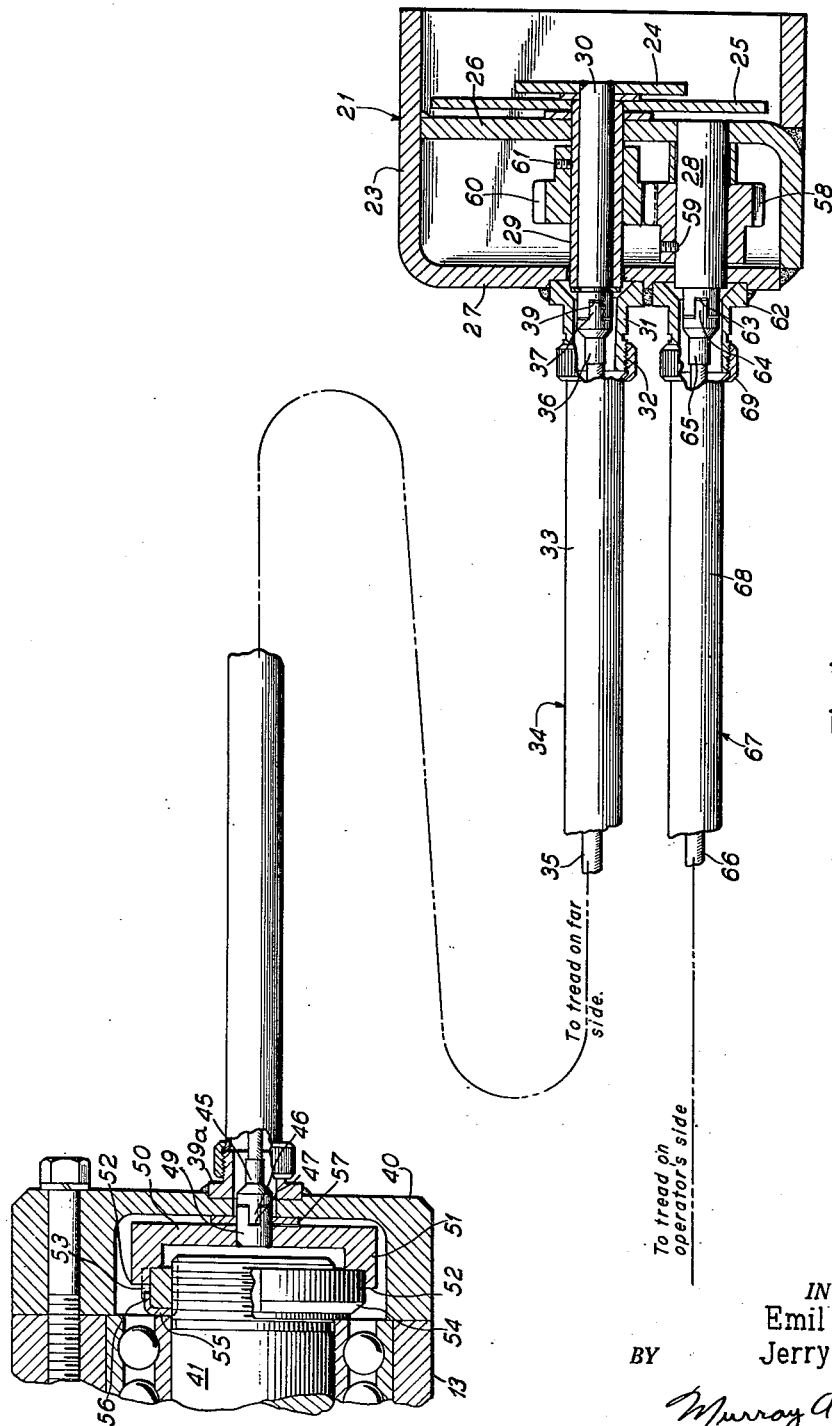

United States Patent Office 2,808,118
Patented Oct. 1, 1957

2,808,118
CRAWLER SPEED INDICATOR

Emil J. Hlinsky, La Grange Park, and Jerry Karlovsky, Cicero, Ill., assignors to Goodman Manufacturing Company, Chicago, Ill., a corporation of Illinois Application March 10, 1955, Serial No. 493,318

3 Claims. (Cl. 180—9.1)

This invention relates to improvements in continuous mining machines of the type supported and propelled on continuous traction tread devices, and more particularly relates to a simplified and improved means for indicating the relative speeds of the traction tread devices of the machine.

Continuous mining machines of the type operable to cut and dislodge coal from the working face of a mine and advanced by independently driven traction tread devices, and having a conveyor extending along the machine for picking up the mined coal and discharging it into a suitable material transportation device are usually operated by an operator standing on the ground along one side of the machine.

The conveyor, and operative parts of the machine usually take up so much vertical space that the operator standing along one side of the machine cannot determine whether the two traction tread devices are operating or whether one is traveling faster than the other.

As a result, one traction tread device may be slipping while the other is not in operation causing the slipping traction tread device to mire in the mine bottom where the bottom may be soft.

Also due to the bulk of such machines and the confined spaces in which they are operating, it is extremely important that the machine travel in a straight line when entering and leaving a working place, otherwise it may become wedged between the ribs of the working place along which it is traveling.

It, therefore, is a principal object of our invention to provide a simple and improved form of indicating means adjacent the operator's station of a continuous mining machine or the like, to enable the operator to readily determined the relative speeds of travel of the traction tread devices supporting and propelling the machine.

A further object of our invention is to provide a simple and novel speed indicator for the traction tread devices of a continuous mining machine driven from the traction tread devices of the machine.

Still another object of our invention is to provide a speed indicator for a pair of laterally spaced continuous traction tread devices consisting of two concentric disks of different diameters, each of which is connected to be driven with a traction tread device, to enable the operator of the machine to readily determine when the traction tread devices are travelling at varying rates of speed with respect to each other.

These and other objects of our invention will appear from time to time as the following specification proceeds with reference to the accompanying drawings wherein:

Figure 3 is a partial fragmentary transverse sectional view showing the speed indicating device in transverse section and showing the drive connection from one traction tread device to one of the indicator disks.

Figure 1:
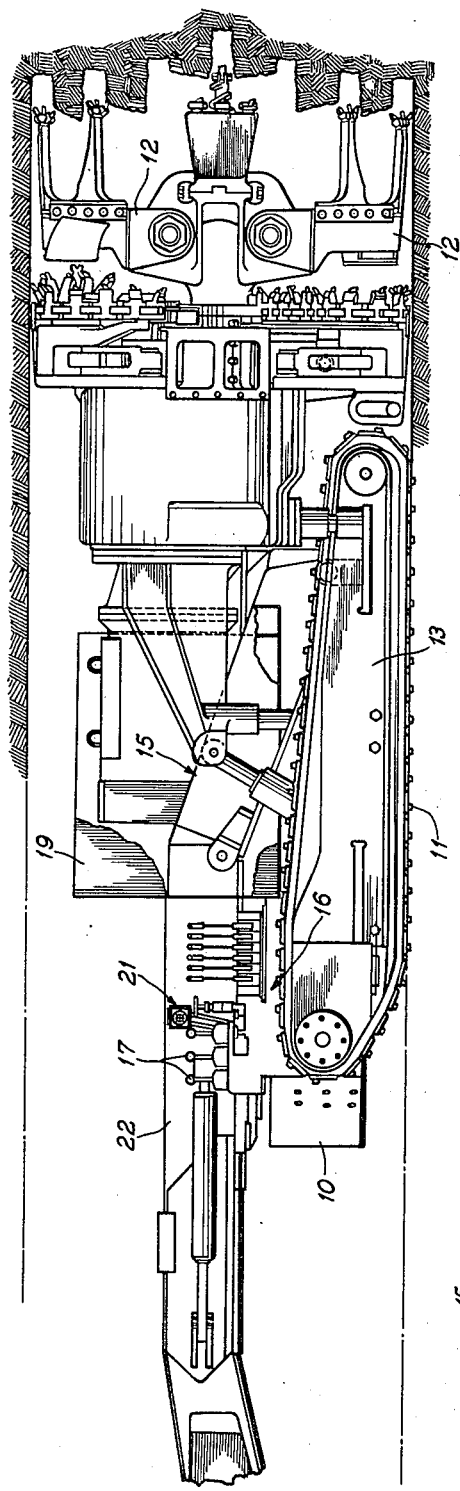
Figure 1 is a fragmentary view in side elevation of a continuous mining machine in operation in a working place of a mine, and showing a speed indicating device constructed in accordance with our invention adjacent the operator's station of the machine.

In the embodiment of our invention illustrated in the drawings, we have shown in Figure 1 a view in side elevation of a mining machine of the continuous mining type in operation at the working face of a mine and cutting and dislodging the coal from the working face in a continuous operation. It will, of course, be understood that the machine herein shown is for illustrative purposes only and that the speed indicator of our invention may be adapted to various forms of continuous mining machines or even loading machines propelled on crawler or continuous traction tread devices, in which it is necessary to determine at a glance the relative speeds of travel of the two traction tread devices.

The machine shown, consists generally in a main frame 10 mounted on a pair of laterally spaced continuous traction tread devices 11 and having a rotary mining element 12 at the forward end thereof for cutting and dislodging coal from the solid. The continuous traction tread devices 11 are each guided for movement along a tread frame 13, supporting the main frame 10 above the ground, and are suitably driven from the motor (not shown) for driving the operative parts of the continuous mining machine in a well known manner so not herein shown or described.

The machine herein shown is of a type somewhat similar to that shown and described in application Serial No. 387,441 filed October 21, 1953, by James S. Robbins and entitled "Continuous Mining Machine," now abandoned, and is no part of our present invention so need not herein be shown or described in detail.

Between the laterally spaced traction tread devices 11 and extending upwardly from the ground and along and over the top of the main frame 10 and beyond the rear end thereof is a conveyor 15 for picking up the mined coal and discharging it into a suitable material carrying receptacle, such as a shuttle car, room conveyor or the like.

At the rear of the main frame 10 is an operator's station 16 having control levers generally indicated by reference character 17, for controlling operation of the traction tread devices 11 and the feeding and transportation of the machine.

Extending along the side of the machine adjacent the operator's station, and forwardly thereof is a control box 19 containing certain of the electrical controls, such as the contactors for controlling the operation of the electrical operating parts of the machine.

It may be seen from Figure 1 that the conveyor 15 and control box 19 extend a substantial distance above the ground and entirely obscure the operator's view to the opposite side of the machine from the operator's station, and thus make it impossible for the operator to see whether or not the continuous tread device opposite the operator's station is in operation, or is slipping on the ground. In order to enable the operator to readily determine the relative speeds between the two continuous traction tread devices, we have provided a speed indicator 21, mounted on a side wall 22 of the conveyor 15, adjacent the control levers 17.

Figure 2:
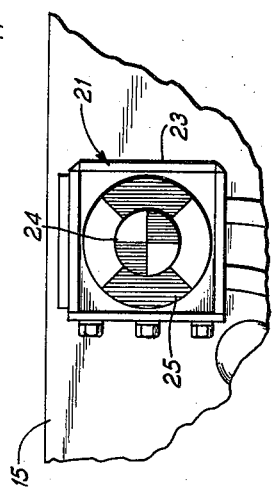
Figure 2 is a fragmentary side view of the machine showing the speed indicator shown in Figure 1 drawn to an enlarged scale.

The speed indicator 21 is shown in Figures 2 and 3 as comprising a casing 23 open at its front end and having 2 coaxial speed indicator discs 24 and 25 of different diameters rotatably carried in the open portion thereof, one of which is driven from one continuous traction tread device 11 and the other of which is driven from the other continuous traction tread device 11.

As shown in Figure 3 the casing 23 has a wall 26 spaced inwardly of the open end thereof and a rear end wall 27. The walls 26 and 27 are shown as forming bearing supports for a rotatable sleeve 29 rotatably carried therein and extending beyond the forward end of the wall 26. The sleeve 29 has the indicator disc 25 secured to its outer end for rotating the same upon rotatable movement of said sleeve.

Rotatably carried within the sleeve 29 and extending beyond opposite ends thereof is a shaft 30 carrying the small diameter disc 24, which is welded or otherwise secured thereto.

The rear end of the shaft 30 extends within a fitting 31 having a threaded end portion 32 for a flexible casing 33 of a flexible drive shaft 34. The flexible drive shaft 34 may be of any well known form and is no part of my present invention so need not herein be shown or described further.

The flexible drive shaft 34 includes a flexible drive cable 35 within the casing 33 and having a drive member 36 at one end thereof having a tongue 37 extending within a transverse slot 39 formed in the shaft 30, for rotatably driving the same. The opposite end of the flexible casing 33 from the connector or coupling 31 is shown as being threaded on a fitting 39a or otherwise secured to an end cap 40 for a shaft 41 in the drive train for a continuous tread device 11. The end cap 40 is bolted or otherwise secured to the tread frame 13 and forms a closure for the inner end of the shaft 41 and the bearings therefor.

The flexible drive cable 35 extends within the fitting 39a and has a coupling 45 on its end driven from the shaft 41. The coupling 45 like the coupling 36 has a projecting tongue 46 engageable within a groove 47 of a coupling member 49 secured to and extending from a driving dog 50, coaxial with the axis of the shaft 41 and rotatably driven thereby.

As herein shown, the driving dog 50 has an annular flanged portion 51 having a plurality of spaced jaws 52 thereon, engaging recessed portions 53 of a nut 54 threaded on the end of a shaft 41. The nut 54 is locked for rotation with the shaft 41 as by a retainer and lock washer 55 having turned over end portions 56 engageable within the recessed portions 53. A thrust washer or bearing 57 is shown as being carried on the coupling member 49 and as being interposed between the end surface of the driving dog 50 and the inside of the end cap 40 to retain the jaws 52 in engagement with the recessed portions 53 of the nut 54.

The indicator disc 25 on the sleeve 29 is driven from a shaft 28 rotatably carried in the walls 26 and 27 of the housing 23 and having a drive gear 58 secured thereto between the walls 26 and 27 as by a set screw 59. The gear 58 meshes with and drives a drive gear 60 suitably secured to the sleeve 29 as by a set screw 61. The gears 58 and 60 are shown as being of the same diameter to effect rotation of the indicator disc 24 at the speed of rotation of the indicator disc 25 when the continuous tread devices are both travelling at the same linear speeds.

The shaft 28 like the shaft 30 extends rearwardly from the wall 27 within a fitting 62, and has a transverse slot 63 extending across its inner end portion, which is engaged by a tongue 64 of a coupling 65 on the end of a flexible drive cable 66 of a flexible drive shaft 67. The flexible drive shaft 67 like the flexible drive shaft 34, includes a flexible casing 68 having a fitting or a coupling 69 on one end thereof threaded on the fitting 62. The opposite end of the flexible drive cable 66 is driven from the continuous tread device 11 on the operator's side of the machine in the same manner the flexible drive cable 35 is driven from the far continuous tread device so the illustration of the drive and description thereof need not be repeated herein.

The indicator discs 24 and 25 are shown as being divided into quadrants, which may be of different colors to enable the operator to more readily visualize the differences in speed between one continuous tread device and the other.

It may be seen in the foregoing that a simplified indicating means has been provided to enable the operator of a continuous mining machine or any machine supported on and propelled along the ground by laterally spaced continuous traction tread devices to see at a glance whether both continuous tread devices are in operation or whether one is travelling at a faster or a slower speed than the other.

It will be understood that various modifications and variations of the present invention may be effected without departing from the spirit and the scope of the novel concepts thereof.

We claim as our invention:

1. In a speed indicator for indicating the relative speeds of a pair of laterally spaced continuous tread devices, a drive shaft for each tread device terminating inwardly therefrom, a housing having an open outer end portion, two coaxial indicating discs of different diameters rotatably carried in the open portion of said housing, a sleeve rotatably supporting the larger of said discs, a shaft carried within said sleeve and rotatably supporting the smaller of said discs, two driving dogs each having a coupling thereon, means maintaining said driving dogs in driven engagement with the ends of said driven shafts, two flexible drive shafts, a drive connection from said couplings to said flexible drive shafts, a direct drive connection from one of said flexible drive shafts to said shaft having said indicating discs thereon, and a geared drive connection from said other flexible drive shaft to said sleeve.

2. In a machine operable in confined spaces underground, a main frame, laterally spaced continuous traction tread devices supporting said main frame on the ground and propelling said main frame along the ground, control means at one side of said main frame adapted for operation from one side of the machine for controlling operation of said continuous tread devices, a tread frame for each tread device having supporting connection with said main frame, a shaft journaled in each tread frame and rotatable upon travel of an associated tread device, the improvements comprising speed indicating means indicating the relative speeds of travel of said tread devices to an operator standing at one side of the machine and operating said control means, comprising a housing located adjacent said control means and opening toward the operator of the machine, two coaxial indicating disks of different diameters rotatably journaled within said housing and visible through the open portion of said housing, a sleeve journaled within said housing and having one of said disks secured thereto, a shaft rotatably journaled within said sleeve and having the other of said disks secured thereto, two flexible drive shafts, a separate driving dog rotatably carried in each tread frame and coupled with an associated shaft carried therein and driven therefrom, a driving connection from each driving dog to an associated flexible drive shaft, a direct drive connection from one flexible shaft to said shaft rotatably journaled within said sleeve, and a geared drive connection from the other flexible drive shaft to said sleeve for driving said indicating disks in accordance with the speeds of travel of the respective tread devices.

3. In a machine operable in confined spaces underground, a main frame, laterally spaced continuous traction tread devices supporting said main frame on the ground and propelling said main frame along the ground, control devices at one side of said main frame for controlling operation of said continuous traction tread devices and operable by an operator standing on the ground to one side of the machine, a separate tread frame for each continuous traction tread device for supporting said main frame on said tread devices above the ground, a shaft journaled in each tread frame and rotatable upon travel of an associated tread device, the improvements comprising speed indicating means indicating the relative speeds of travel of said traction tread devices, comprising a housing located adjacent said control means and having an open portion visible to an operator at one side of the machine when standing on the ground, two coaxial indicating disks of different diameters in said open portion of said housing and rotatably journaled within said housing, a sleeve journaled within said housing and having one of said disks secured thereto, a shaft journaled within said sleeve and having the other of said disks secured thereto, a parallel shaft within said housing, gearing connecting said parallel shaft with said sleeve for driving said sleeve at the same speed as the speed of the said parallel shaft, flexible drive shafts having driving connection with said parallel shafts, and driving connections from said shafts journaled within said tread frames to said flexible drive shafts, comprising a separate driving dog for each flexible drive shaft having engagement with an inner end of an associated shaft journaled within said tread frame and driven thereby, and an end cap for each shaft extending over the end thereof and maintaining said driving dog in driven engagement with an associated shaft and secured to an associated tread frame, for closing the end of said shaft journaled therein and forming a retaining means for an associated flexible drive shaft to the drive shaft therefor journaled within said tread frame.

References Cited in the file of this patent

UNITED STATES PATENTS

| | | |
|---|---|---|
| 1,771,625 | Halleck | July 29, 1930 |
| 2,167,332 | Emery | July 25, 1937 |
| 2,317,093 | Blanks | Apr. 20, 1943 |
| 2,475,219 | Cartwright | July 5, 1949 |
| 2,518,481 | Maguire | Aug. 15, 1950 |